Patented Apr. 17, 1928.

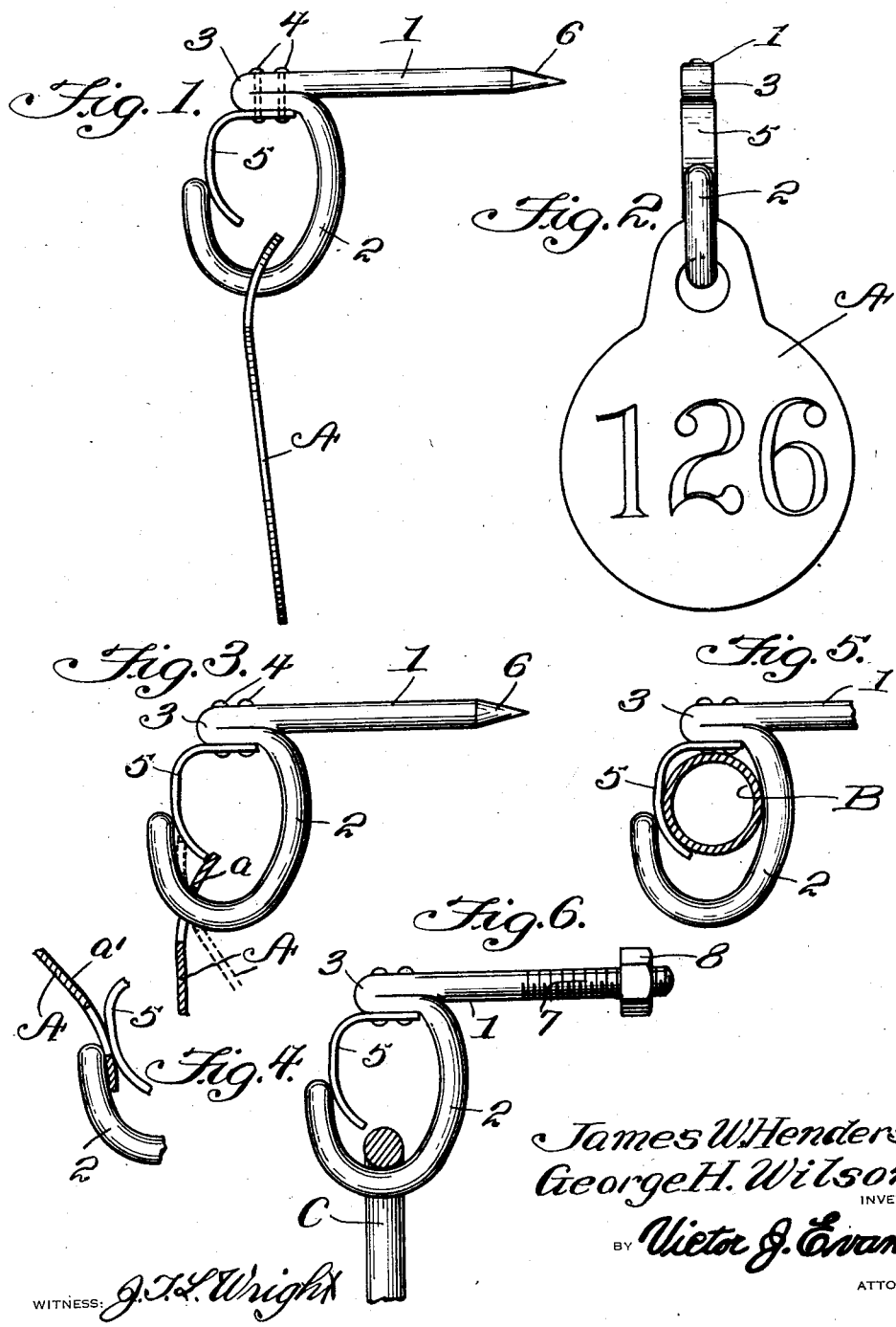

1,666,820

UNITED STATES PATENT OFFICE.

JAMES W. HENDERSON AND GEORGE H. WILSON, OF DUNMORE, PENNSYLVANIA.

CHECK HOLDER.

Application filed March 28, 1927. Serial No. 179,038.

This invention relates to a hook-like holder for metal checks, lanterns, rods and the like, the general object of the invention being to provide a stem having either a pointed end or a threaded end to receive a nut with a hook formed by bending the outer end of the stem and a spring fastened to the outer end of the stem for holding an object in the hook.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a side view of a holder provided with a pointed end and used to hold a check.

Figure 2 is a front view of Figure 1.

Figures 3 and 4 are views showing how the check is manipulated to detach it from the hook.

Figure 5 is a view showing how the holder is used to support a rod.

Figure 6 is a view showing the device provided with a threaded end to receive a nut and used to support the bail of a lantern or the like.

As shown in these views, the holder comprises a stem 1 and a hook 2, the hook being formed by an extension of the stem which is bent backwardly a short distance to bear against the outer end of the stem and then bent downwardly and upwardly to form the hook. By having the inner end of the hook extend parallel with the outer end of the stem, a thickened part 3 is formed at the outer end of the stem which forms a head to receive the blows of a hammer or the like to drive the device into a supporting member. It also provides a strong part to receive the rivets 4 which hold the spring 5 in place, this spring acting to close the hook to hold articles therein. The stem may be provided with a pointed end, as shown at 6, in Figures 1 or 3 or it may be provided with a threaded end, as shown at 7 in Figure 6, to receive a nut 8, the device shown in Figures 1 and 3 being driven into a supporting member while that shown in Figure 6 is adapted to be passed through a hole in the supporting member and held therein by a nut.

Figures 1, 2, 3 and 4 show the device as used for holding checks, such as shown at A, while Figure 5 shows the device in use as holding a tubular rod B which may be a curtain pole or the like, and Figure 6 shows the device holding a bail C of a lantern or the like. Figures 3 and 4 show how the check A is manipulated to remove it from the hook. The check is first moved toward the rear part of the hook and turned so that its upper end will pass under the spring, as shown at $a$ in Figure 3. Then the check is turned over to place its small end lowermost, as shown at $a'$ in Figure 4, so that by exerting a pull upon the check, its small end will pass from between the spring and the beak of the hook.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A holding device of the character described comprising a shank adapted to be arranged horizontally on a support, one end of said shank being bent rearwardly in contacting engagement with one side of the shank to provide the shank with a relatively thickened end portion, said bent portion being extended to provide a hook lying directly beneath and in the same plane with the shank, and a curved spring closing the mouth of the hook and having one end riveted to said thickened portion of the shank.

In testimony whereof we affix our signatures.

JAMES W. HENDERSON.
GEORGE H. WILSON.